US012798681B2

(12) United States Patent
Frappampina et al.

(10) Patent No.: US 12,798,681 B2
(45) Date of Patent: Nov. 17, 2026

(54) MOTOR VEHICLE FRONT-END

(71) Applicant: STELLANTIS EUROPE S.P.A., Turin (IT)

(72) Inventors: Marco Frappampina, Turin (IT); Danilo Casale, Turin (IT)

(73) Assignee: STELLANTIS EUROPE S.P.A., Turin (IT)

( * ) Notice: Subject to any disclaimer, the term of this patent is extended or adjusted under 35 U.S.C. 154(b) by 192 days.

(21) Appl. No.: 18/866,121

(22) PCT Filed: May 17, 2023

(86) PCT No.: PCT/IB2023/055058
§ 371 (c)(1),
(2) Date: Nov. 15, 2024

(87) PCT Pub. No.: WO2023/223222
PCT Pub. Date: Nov. 23, 2023

(65) Prior Publication Data
US 2025/0304182 A1 Oct. 2, 2025

(30) Foreign Application Priority Data
May 18, 2022 (IT) ........................ 102022000010322

(51) Int. Cl.
*B62D 25/08* (2006.01)
*B60K 11/04* (2006.01)

(52) U.S. Cl.
CPC ............ *B62D 25/084* (2013.01); *B60K 11/04* (2013.01)

(58) Field of Classification Search
CPC ..... B62D 25/084; B62D 25/085; B60K 11/04
See application file for complete search history.

(56) References Cited

U.S. PATENT DOCUMENTS 6,412,581 B2 * 7/2002 Enomoto ............... B60K 11/04 165/69
6,571,898 B2 * 6/2003 Guyomard .............. F16F 15/08 165/69

(Continued)

FOREIGN PATENT DOCUMENTS

CN 108349376 B * 2/2021 ........... B60K 11/085
DE 102004024151 A1 1/2005

(Continued)

OTHER PUBLICATIONS

International Search Report and Written Opinion of the ISA issued in PCT/IB2023/055058, mailed Sep. 8, 2023; ISA/EP.

*Primary Examiner* — Steve Clemmons
(74) *Attorney, Agent, or Firm* — Harness, Dickey & Pierce, P.L.C.

(57) ABSTRACT

A motor vehicle front-end is provided with a heat exchanger assembly, having two side posts, at least one radiator supported by the side posts, and two attachment appendages, outwardly projecting from the side posts along a horizontal direction; the front-end is further provided with a frame with two side portions respectively supporting the appendages; these side portions have respective guides, which are engaged by the appendages in a longitudinally sliding manner and have a sufficiently wide length to be able to arrange the appendages in two longitudinal positions, different from each other; for each guide, a wedge, which engages a space not engaged by the appendage, is provided.

10 Claims, 4 Drawing Sheets

(56) References Cited

U.S. PATENT DOCUMENTS

| | | | | |
|---|---|---|---|---|
| 2010/0078149 | A1 * | 4/2010 | Yoshimitsu | B62D 25/084 296/193.09 |
| 2011/0284301 | A1 | 11/2011 | Bui et al. | |

FOREIGN PATENT DOCUMENTS

| | | | | | |
|---|---|---|---|---|---|
| DE | 102014226758 | A1 | * | 6/2016 | B60K 11/04 |
| DE | 102016203806 | A1 | | 10/2016 | |
| FR | 2922823 | A1 | | 5/2009 | |
| FR | 3001919 | A1 | * | 8/2014 | B60K 11/04 |
| KR | 20110000867 | A | | 1/2011 | |
| KR | 20110032027 | A | * | 3/2011 | B62D 25/085 |
| KR | 20160096932 | A | * | 8/2016 | B60R 19/18 |

* cited by examiner

MOTOR VEHICLE FRONT-END

CROSS-REFERENCE TO RELATED APPLICATIONS

This patent application is a U.S. National Phase Application under 35 U.S.C. 371 of International Application No. PCT/IB2023/055058, filed on May 17, 2023, which claims priority from Italian patent application no. 102022000010322 filed on May 18, 2022. The entire disclosures of the above applications are incorporated herein by reference.

TECHNICAL FIELD

The present invention relates to a motor vehicle front-end.

BACKGROUND

As is known, motor vehicles include a heat exchanger assembly that includes at least one radiator to lower the temperature of a heat exchange liquid; this assembly is arranged in a front zone of the engine compartment and is supported by a metal frame comprising an upper horizontal cross member, to which a hood couples, in a releasable manner, to close the engine compartment from above.

For a same model of motor vehicle, there is the need to be able to mount the heat exchanger assembly in two different positions, along the longitudinal direction of forward movement of the motor vehicle, according to the type of powertrain to be installed in the engine compartment, for example according to its power and its dimensions.

In particular, a more powerful powertrain tends to be bulkier and hence tends to require the heat exchanger assembly to be positioned farther forward so as to have more space in the engine compartment. On the contrary, a less powerful powertrain tends to be less bulky and hence allows the heat exchanger assembly to be positioned farther back. With a more rearward positioning, the heat exchanger assembly is naturally farther from the front bumper: an arrangement of this type can have advantages with regard to the degree of safety in the case of a frontal impact accident, based on the impact test conducted according to current legislation and, consequently, based on the safety rates that are normally awarded during these tests (for example, these rates can be used by insurance companies to establish the insurance premium of motor vehicles: a higher degree of safety tends to entail a better score and hence a lower insurance premium).

In known solutions, to mount the heat exchanger assembly in two different longitudinal positions it is necessary to design and produce the support structures provided at the front-end of the motor vehicle in a specific and dedicated manner. In other words, it is necessary to design and produce a structure to support the heat exchanger assembly farther forward and another structure to support the heat exchanger assembly farther back. However, solutions of this type have a relatively high cost, both owing to the fact that a large number of different components must be designed, produced and stored, but above all due to the low level of flexibility along production lines in which the heat exchanger assembly is mounted.

It would therefore be beneficial to design a flexible solution, in relation to the mounting of the heat exchanger assembly, so as to be able to adapt its position in longitudinal direction according to specific needs or requirements, changing the design of the motor vehicle as little as possible and replacing the smallest possible number of components, in order to reduce design and production times and costs.

SUMMARY

The object of the present invention is to provide a motor vehicle front-end, which makes it possible to fulfil the requirements set forth above in a simple and inexpensive manner.

According to the present invention, a motor vehicle front-end, as defined in claim 1, and a method for mounting a heat exchanger assembly in a motor vehicle front-end, according to claim 10, are provided. Besides, preferred embodiments form the subject matter of the appended dependent claims.

BRIEF DESCRIPTION OF THE DRAWINGS

The invention will now be described with reference to the accompanying drawings, which illustrate a non-limiting example thereof, wherein.

DESCRIPTION OF PREFERRED EMBODIMENTS

Figure 1:
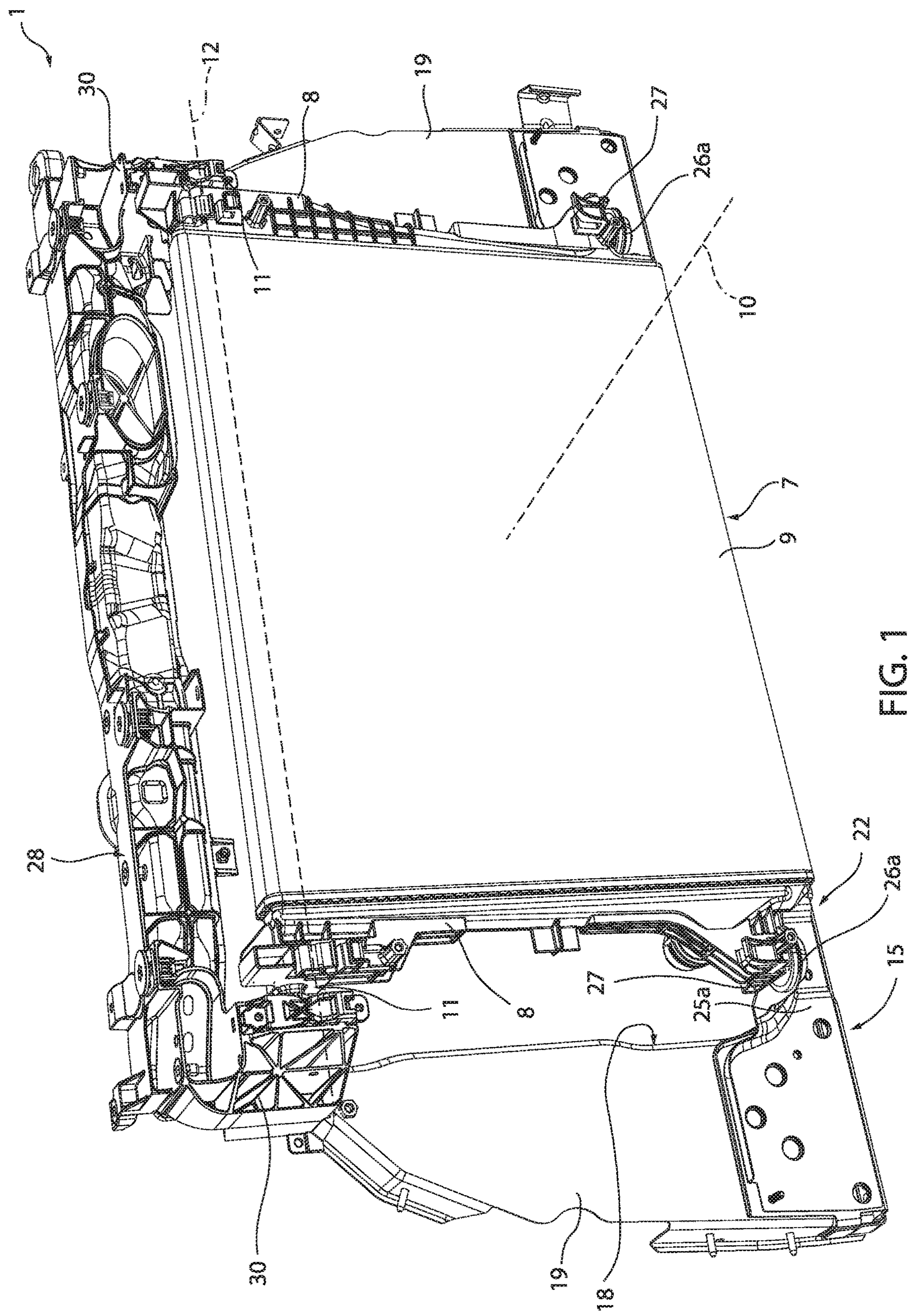
FIG. 1 is a perspective front view showing, partially and schematically, a preferred embodiment of the motor vehicle front-end according to the present invention, in a first configuration to install, in particular, a first type of powertrain, not illustrated.

In FIG. 1, the reference number 1 indicates, as a whole, a front-end (partly illustrated) of a motor vehicle. The front-end 1 is arranged in a front zone of an engine compartment of the motor vehicle, behind a bumper (not illustrated) and is configurable during the production steps to adapt to different types of powertrains (not illustrated) to be installed in the engine compartment.

Figure 3:
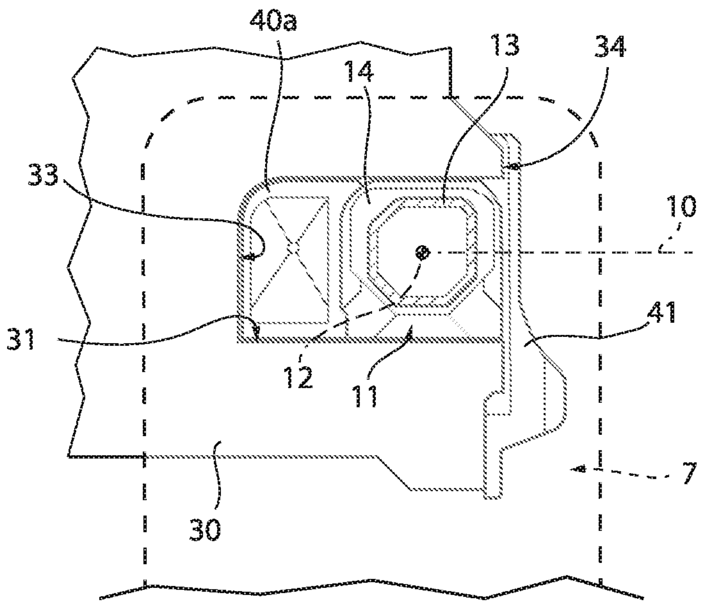
FIG. 3 is a perspective side view showing a detail of FIG. 1, in enlarged scale and with parts s removed for clarity.
Figure 5:
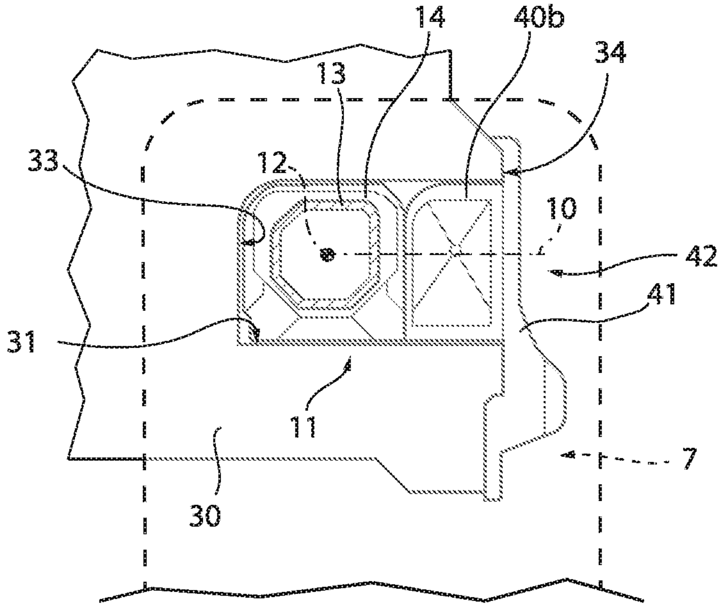
FIGS. 5 and 6 are similar to FIGS. 3 and 4, respectively, and relate to a second configuration of the front-end according to the present invention, in particular to install a second type of powertrain, not illustrated.

The front-end 1 comprises a heat exchanger assembly 7 (partially illustrated), which comprises, in turn, two side posts 8 and at least one radiator 9 (illustrated schematically), arranged between the posts 8 and oriented orthogonally to an axis 10 that coincides with the axis of forward movement of the motor vehicle. The posts 8 support the radiator 9 in a known manner, not described in detail, and, in turn, are carried by respective attachment appendages 11, laterally outwardly projecting therefrom along a horizontal direction 12. With reference to FIGS. 3 and 5, in particular, each attachment appendage 11 comprises a core 13, fixed relative to the corresponding post 8 and preferably made of metal material, and a sleeve 14, which surrounds the core 13 and is made of plastic or elastomeric material.

Again with reference to FIG. 1, the front-end 1 further comprises a support structure defined by a frame 15, supporting the assembly 7 and defining the perimeter of an opening 18 (for example, substantially rectangular in shape) that is coaxial with the axis 10 and at least partially accommodates the assembly 7.

The frame 15 comprises two side posts 19, normally called "vertical links" and, in general, secured to the front ends of two longitudinal struts (not illustrated) of the motor vehicle. In particular, the posts 19 are defined by respective vertical plates, which are aligned longitudinally with the struts and have respective holes (not illustrated) for coupling to these struts.

The frame 15 further comprises a lower cross member 22, which supports the lower ends of the posts 8 and, preferably, comprises a rear member 24 (FIG. 2) joined to the lower ends of the posts 19 in a known manner, not described in detail, and supports a front bracket 25*a*. This latter is arranged in front of the member 24 (considering the axis 10) and comprises two projections 26*a* that are provided with vertical through holes and are coupled, respectively, to lower ends 27 of the posts 8.

Figure 2:
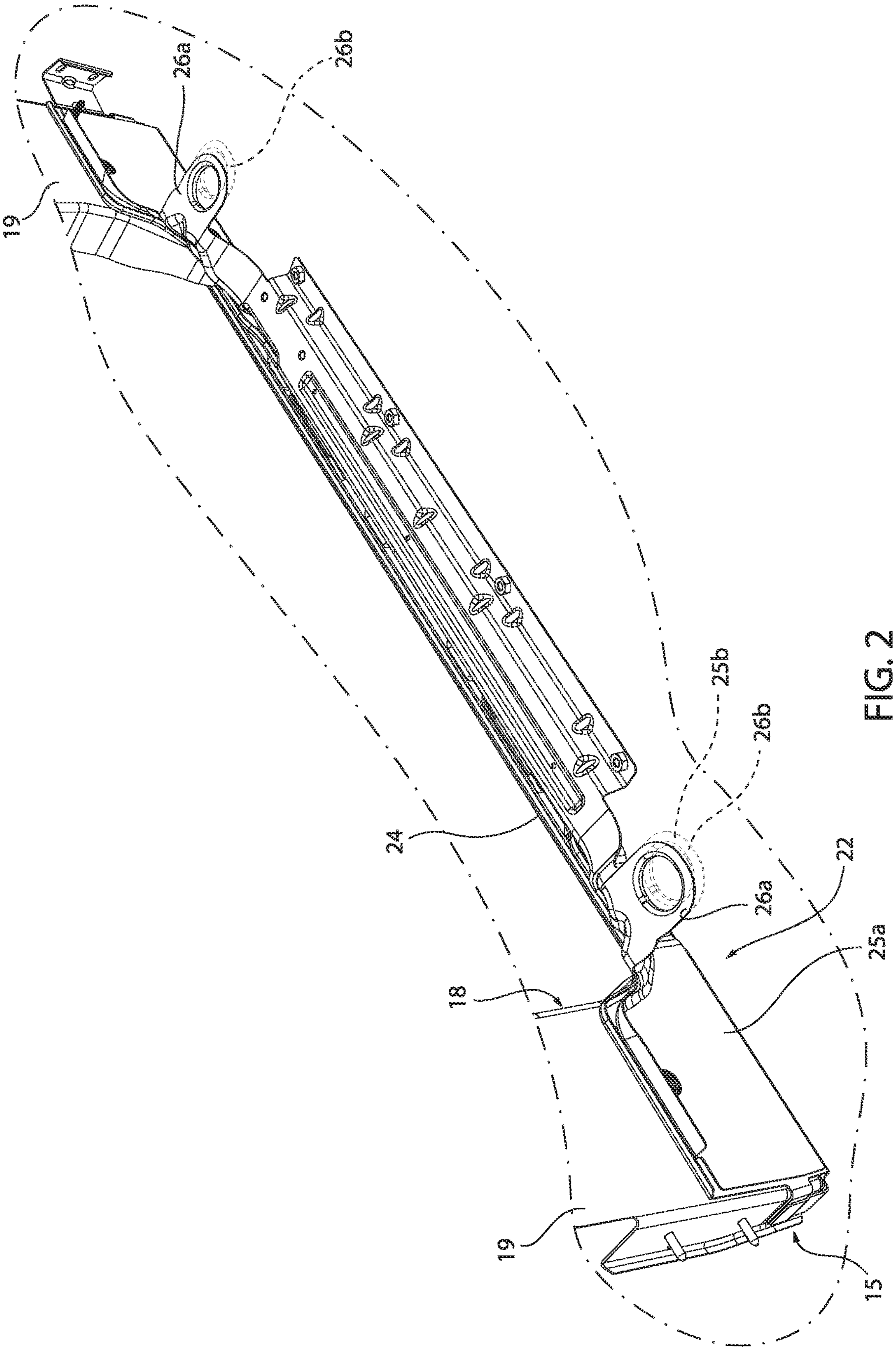
FIG. 2 is a perspective top view of a detail of FIG. 1, with parts removed for clarity.

With reference to FIG. 2, according to a preferred aspect of the present invention, the bracket 25*a* is secured to the member 24 so as to be interchangeable with a different bracket 25*b*, illustrated partially and with a dashed line, to change the configuration of the front-end 1 in the motor vehicle assembly lines: in detail, the brackets 25*a* and 25*b* are arranged selectively (i.e., alternatively to each other) on a front face of the member 24 and are secured thereto by threaded elements, such as screws. Essentially, the bracket 25*b* differs from the bracket 25*a* due to the fact that it has projections 26*b* with holes positioned differently to the projections 26*a* (so as to be able to arrange and mount the lower ends 27 of the posts 8 farther toward the front or farther toward the rear relative to the frame 15).

Returning to FIG. 1, the frame 15 further comprises an upper cross member 28, which is arranged below a hood of the motor vehicle (not illustrated) and ends laterally with two portions 30 opposite each other, joined to the upper ends of the posts 19 in a known manner, not described in detail.

According to the present invention, the portions 30 respectively support the appendages 11 and are shaped so as to be able to arrange and mount the appendages 11 farther toward the front or farther toward the rear (along the axis 10) relative to the frame 15. In particular, with reference to FIGS. 3 to 6, the portions 30 have respective positioning guides 31, which are parallel to the axis 10 and have a sufficiently wide length to be able to arrange the appendages 11 in two different longitudinal positions and thus obtain two different configurations. In detail, these positions are spaced apart longitudinally from each other by a gap, for example of around 25 mm: therefore, the length of the guide 31 is at least equal to the sum of this gap (for example, of 25 mm) and of the longitudinal dimensions of the appendages 11. In particular, the length of the guide 31 refers to a rear shoulder 33, while the front end of the guide 31 has an inlet opening 34 for longitudinally inserting the appendages 11 when the assembly 7 is mounted on the frame 15. More in particular, in side view (FIGS. 3 and 5), the portions 30 are C-shaped, so that each guide 31 is defined by a channel having, at the front, the inlet opening 34.

Figure 6:
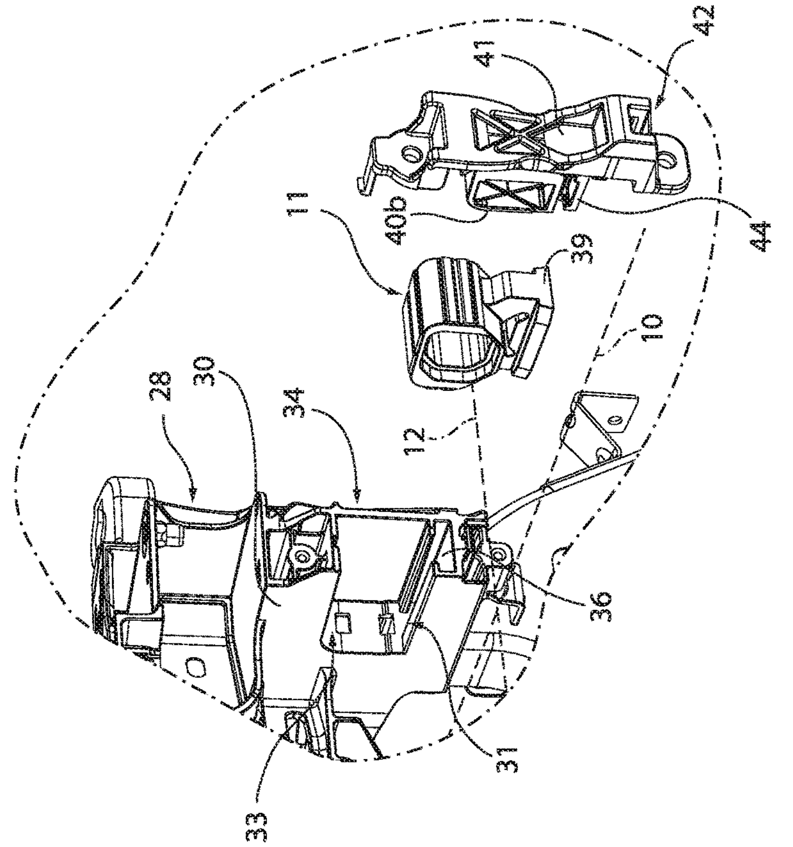
Figure 4:
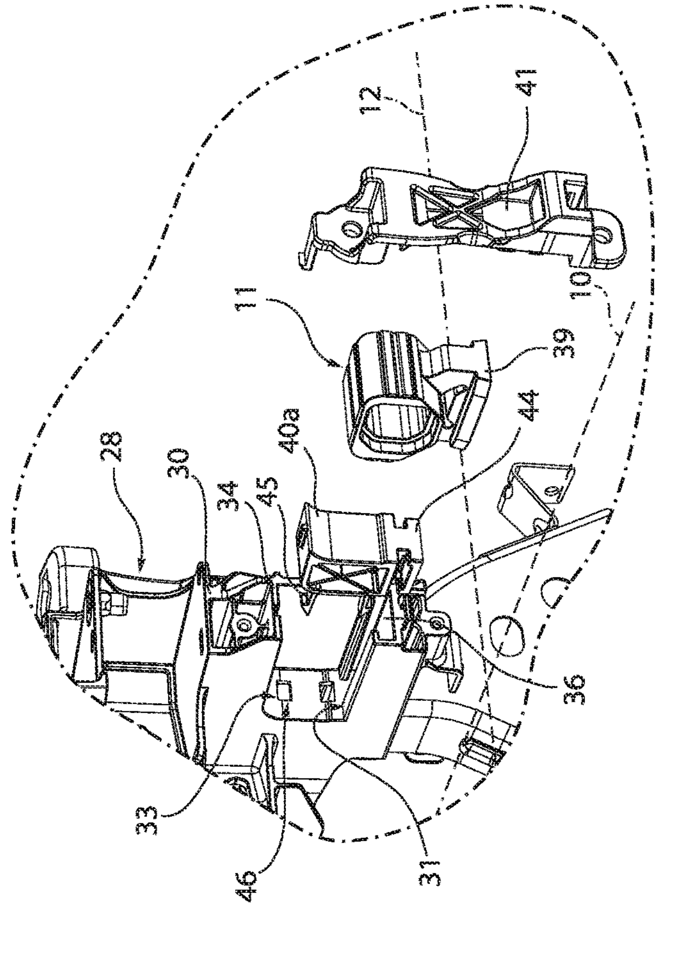
FIG. 4 shows the detail of FIG. 3, with an exploded view of parts and from a different point of view.

Preferably, with reference to FIGS. 4 and 6, each guide 31 has a longitudinal rail 36, engaged by the corresponding appendage 11 so as to retain the latter along the direction 12 and guide it along the axis 10. In particular, the sleeve 14 comprises a slide portion 39 having a cross section with a shape complementary to that of the rail 36, to slide along the latter longitudinally, without being free to move laterally along the direction 12. For example, these cross sections are T-shaped or dovetail shaped. For example, the rail 36 is on a lower wall of the guide 31, but it could also be positioned at the side or above.

In each guide 31, the space that is not engaged by the appendage 11 is filled by a wedge, which is identified by the reference number 40*a* in the forward configuration of FIGS. 3 and 4, and by the reference number 40*b* in the rearward configuration of FIGS. 5 and 6. Preferably, a plug 41 is also provided to close the inlet opening 34: in the preferred example illustrated in FIGS. 5 and 6, the plug 41 and the wedge 40*b* form parts of a single piece, indicated by the reference number 42. In particular, the wedges 40*a*, 40*b* and the plug 41 are made of plastic material. In more detail, the plug 41 is secured by threaded elements, for example screws, to the portions 30 of the cross member 28.

Preferably, each wedge 40*a* and 40*b* comprises a slide portion 44 slidingly coupled to the rail 36, similar to the slide portion 39 of the appendage 11. In other words, the portion 44 has a cross section with shape complementary to that of the rail 36, so as to be able to slide longitudinally along the axis 10, without being free to move laterally along the direction 12.

In the forward configuration of FIGS. 3 and 4, the wedge 40*a* is longitudinally arranged between the appendage 11 and the shoulder 33, so that it is blocked between these two elements. In turn, the appendage 11 is blocked in a fixed position along the guide 31 (against the wedge 40*a*) by the plug 41.

As shown in FIG. 4, preferably, each wedge 40*a* comprises at least one wing 45, which projects longitudinally and engages with snap fastening a corresponding retention seat 46 made in the portion 30, to retain the wedge 40*a* at least temporarily in a fixed position, before inserting the appendage 11 into the guide 31 during the assembly steps.

As mentioned above, in the assembly lines, the assembly 7 is positioned farther toward the front or farther toward the rear according to the type of the powertrain, for example according to its power and/or its dimensions.

In the case in which the assembly 7 requires to be mounted in a position farther toward the front along the axis 10, the front-end 1 is configured according to FIGS. 3 and 4. In particular, the frame 15 is equipped with the bracket 25*a*, and the guides 31 are engaged by the wedges 40*a*: in particular, these latter are inserted through the inlet opening 34, and made to slide along the rails 36, until reaching the bottom of the guides 31, against the shoulders 33. At this point, the appendages 11 are inserted into the guides 31 through the inlet openings 34 and, finally, these latter are closed by the plugs 41.

Instead, if the assembly 7 requires to be mounted in a position farther toward the rear, the front-end 1 is configured according to the configuration of FIGS. 5 and 6. Therefore, the frame 15 is equipped with the bracket 25*b*, and the guides 31 are engaged immediately by the appendages 11: these latter are inserted through the inlet openings 34, and made to slide along the rails 36, until reaching the bottom of the guides 31, against the shoulders 33. At this point, the wedges 40*b* are inserted, i.e., the pieces 42, which are secured to the cross member 28, to fill the empty front space of the guides 31 and close the inlet opening 34.

From the foregoing, it is evident that the front-end 1 has features such as to be able to be configured in order to obtain two different positionings of the assembly 7 along the axis 10, without having to change the structure of the frame 15, but simply making use of the depth of the guides 31 in longitudinal direction in the cross member 28 and, preferably, selecting the bracket 25*a* or 25*b* to install on the cross member 22. In particular, the wedges 40*a*, 40*b* allow the space of the guides 31 that remains empty as a result of the positioning of the appendages 11 to be filled in a relatively easy manner. These wedges 40*a*, 40*b*, together with the plugs 41, contribute to blocking the appendages 11, and hence the assembly 7, along the guides 31, without having to adopt complex and/or additional securing systems.

In summary, with the exception of the bracket 25*a*, 25*b*, only one frame 15, which adapts to both positionings of the assembly 7 along the axis 10, requires to be produced and installed. Therefore, the assembly and the configuration of the front-end 1 are very flexible and economical.

Finally, from the above it is evident that modifications and variations can be made to the front-end 1 described and illustrated, without departing from the scope of protection of the present invention, as defined in the appended claims.

In particular, the shape and/or the dimensions and/or the structure of the frame 15 could differ from the illustration provided by way of example.

The invention claimed is:

1. A motor vehicle front-end comprising:

a heat exchanger assembly comprising two side posts, at least one radiator supported by said side posts, and two attachment appendages outwardly projecting from said side posts along a horizontal direction;

a support structure comprising two side portions which support said appendages, respectively;

characterized in that said side portions comprise respective guides which are engaged by said appendages in a longitudinally sliding manner and have a sufficiently wide length to be able to arrange said appendages in two longitudinal positions, different from each other; and characterized by comprising, for each said guide, a respective wedge which engages a space left empty in the guide by the corresponding appendage.

2. The motor vehicle front-end according to claim 1, wherein said guides have a rear shoulder and a front inlet opening; for each said guide, one of said wedge and said appendage being arranged in abutment against said rear shoulder.

3. The motor vehicle front-end according to claim 2, wherein the front inlet opening of each said guide is closed by a plug fixed to said side portion.

4. The motor vehicle front-end according to claim 3, wherein said plugs are secured to said side portions by threaded elements.

5. The motor vehicle front-end according to claim 3, wherein, for each said guide:

said appendage is arranged in abutment against said rear shoulder, and said wedge and said plug are parts of a single piece.

6. The motor vehicle front-end according to claim 2, wherein said wedges are arranged in abutment against said rear shoulder and comprise respective projecting wings engaging respective retention seats made in said side portions.

7. The motor vehicle front-end according to claim 1, wherein said wedges are made of plastic material.

8. The motor vehicle front-end according to claim 1, wherein said guides have respective rails, which are slidingly engaged by slide portions of said wedges and are shaped so as to retain said wedges along said horizontal direction and so as to longitudinally guide said wedges.

9. The motor vehicle front-end according to claim 1, wherein said support structure further comprises a lower cross member, which comprises a rear member and a front bracket supporting lower ends of said side posts and fixed to said rear member in such a way as to be interchangeable.

10. Method for mounting a heat exchanger assembly in a motor vehicle front-end according to claim 1, the method comprising the steps of:

selecting a longitudinal position of said heat exchanger assembly, relative to said support structure, between a forward position and a rearward position, according to a powertrain to be installed in the motor vehicle; and first, afterwards, inserting said wedges and, inserting said appendages into said guides, if the forward position is selected, or first, inserting said appendages and, afterwards, inserting said wedges into said guides, if the rearward position is selected.

* * * * *